United States Patent
Hu et al.

(10) Patent No.: US 7,872,833 B2
(45) Date of Patent: Jan. 18, 2011

(54) HEAD WITH A TRANSDUCER OVERCOAT HAVING A TRAILING AIR FLOW DAM THAT IS SHALLOWLY RECESSED FROM AN AIR BEARING SURFACE

(75) Inventors: Yong Hu, Fremont, CA (US); Eric T. Sladek, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 683 days.

(21) Appl. No.: 11/860,667

(22) Filed: Sep. 25, 2007

(65) Prior Publication Data
US 2008/0259499 A1 Oct. 23, 2008

Related U.S. Application Data

(63) Continuation-in-part of application No. 11/787,515, filed on Apr. 17, 2007.

(51) Int. Cl.
*G11B 21/21* (2006.01)
(52) U.S. Cl. .................................. 360/236.1
(58) Field of Classification Search .......... None
See application file for complete search history.

(56) References Cited

U.S. PATENT DOCUMENTS

| | | | |
|---|---|---|---|
| 5,343,343 A | 8/1994 | Chapin | |
| 5,353,180 A | 10/1994 | Murray | |
| 5,870,250 A | 2/1999 | Bolasna et al. | |
| 5,917,679 A | 6/1999 | Park et al. | |
| 5,940,249 A | 8/1999 | Hendriks | |
| 6,021,020 A | 2/2000 | Itoh et al. | |
| 6,055,127 A | 4/2000 | Boutaghou et al. | |
| 6,072,662 A | 6/2000 | Utsunomiya | |
| 6,188,547 B1 | 2/2001 | Gui et al. | |
| 6,212,032 B1 | 4/2001 | Park et al. | |
| 6,359,754 B1 * | 3/2002 | Riddering et al. | 360/236.6 |
| 6,445,542 B1 | 9/2002 | Levi et al. | |
| 6,483,667 B1 | 11/2002 | Berg et al. | |
| 6,490,135 B1 | 12/2002 | Sannino et al. | |

(Continued)

FOREIGN PATENT DOCUMENTS

JP 07-021714 1/1995

OTHER PUBLICATIONS

Office Action dated Mar. 2, 2010 from U.S. Appl. No. 11/787,515, 22 pages.

(Continued)

*Primary Examiner*—Mark Blouin (57) ABSTRACT

A head includes a transducer and a slider having an air bearing surface (ABS) and a trailing face. The slider has an overcoat layer that includes the trailing face and that overcoats the transducer. The ABS includes a trailing pad having a major surface adjacent the transducer, with the major surface lying in a primary plane. The ABS also includes a sub-ambient pressure cavity disposed upstream of the overcoat layer and being recessed from the primary plane by a cavity depth in the range 0.8 to 2 microns. The overcoat layer includes a trailing air flow dam being recessed from the primary plane by a step depth in the range 0.05 to 0.5 microns. The overcoat layer also includes a corner region recessed from the primary plane by at least the cavity depth.

11 Claims, 7 Drawing Sheets

U.S. PATENT DOCUMENTS

| | | |
|---|---|---|
| 6,498,701 B1 | 12/2002 | Berg |
| 6,504,682 B1 | 1/2003 | Sannino et al. |
| 6,515,831 B1 | 2/2003 | Sannino et al. |
| 6,594,113 B2 | 7/2003 | Rao et al. |
| 6,603,639 B1 | 8/2003 | Polycarpou et al. |
| 6,661,612 B1 | 12/2003 | Peng |
| 6,690,545 B1 | 2/2004 | Chang et al. |
| 6,707,631 B1 | 3/2004 | Haddock |
| 6,747,847 B2 | 6/2004 | Stoebe et al. |
| 6,785,093 B2 | 8/2004 | Baba et al. |
| 6,920,016 B2 * | 7/2005 | Yamakura et al. ........ 360/235.7 |
| 6,989,967 B2 * | 1/2006 | Pendray et al. .......... 360/236.5 |
| 7,009,813 B2 | 3/2006 | Kang et al. |
| 7,019,945 B1 | 3/2006 | Peng et al. |
| 7,027,265 B2 | 4/2006 | Koishi |
| 7,251,106 B2 | 7/2007 | Nikitin et al. |
| 7,289,299 B1 | 10/2007 | Sun et al. |
| 7,583,473 B2 | 9/2009 | Bolasna et al. |
| 7,616,405 B2 | 11/2009 | Hu et al. |
| 7,719,795 B2 | 5/2010 | Hu et al. |
| 2001/0030834 A1 | 10/2001 | Kohira et al. |
| 2002/0008938 A1 | 1/2002 | Nath et al. |
| 2002/0012199 A1 | 1/2002 | Polycarpou et al. |
| 2002/0030938 A1 | 3/2002 | Boutaghou et al. |
| 2002/0041467 A1 | 4/2002 | Boutaghou et al. |
| 2002/0048120 A1 | 4/2002 | Boutaghou et al. |
| 2002/0051316 A1 | 5/2002 | Boutaghou |
| 2002/0060881 A1 | 5/2002 | Chapin et al. |
| 2002/0071216 A1 | 6/2002 | Sannino et al. |
| 2002/0089789 A1 | 7/2002 | Baba et al. |
| 2002/0109941 A1 | 8/2002 | Chapin et al. |
| 2003/0058578 A1 | 3/2003 | Boutaghou et al. |
| 2003/0067719 A1 | 4/2003 | Boutaghou et al. |
| 2003/0128471 A1 | 7/2003 | Bolasna et al. |
| 2003/0227717 A1 | 12/2003 | Cha et al. |
| 2004/0032694 A1 | 2/2004 | Sun et al. |
| 2004/0100732 A1 | 5/2004 | Deng et al. |
| 2004/0156143 A1 | 8/2004 | Kang |
| 2004/0233580 A1 | 11/2004 | Yao et al. |
| 2004/0240109 A1 | 12/2004 | Hamann et al. |
| 2005/0099728 A1 | 5/2005 | Deng et al. |
| 2005/0105216 A1 | 5/2005 | Ueno et al. |
| 2005/0190500 A1 | 9/2005 | Song |
| 2005/0207065 A1 | 9/2005 | Takagi |
| 2005/0213252 A1 | 9/2005 | Park |
| 2005/0225902 A1 | 10/2005 | Kohira |
| 2006/0023358 A1 | 2/2006 | Huang |
| 2006/0119986 A1 | 6/2006 | Takeuchi et al. |
| 2006/0238922 A1 | 10/2006 | Hanyu |
| 2007/0121238 A1 * | 5/2007 | Kondo et al. ................. 360/69 |
| 2007/0206326 A1 | 9/2007 | Zhang |
| 2007/0211385 A1 | 9/2007 | Kondo et al. |
| 2008/0024924 A1 | 1/2008 | Bolasna et al. |

OTHER PUBLICATIONS

Office Action dated Jun. 16, 2010 from U.S. Appl. No. 11/787,515, 9 pages.

Notice of Allowance dated Aug. 23, 2010 from U.S. Appl. No. 11/787,515, 6 pages.

Office Action dated Jun. 16, 2010 from U.S. Appl. No. 11/860,667, 29 pages.

* cited by examiner

HEAD WITH A TRANSDUCER OVERCOAT HAVING A TRAILING AIR FLOW DAM THAT IS SHALLOWLY RECESSED FROM AN AIR BEARING SURFACE

CROSS-REFERENCE TO RELATED APPLICATION

This application is a continuation in part of U.S. application Ser. No. 11/787,515 entitled "HEAD WITH AN AIR BEARING SURFACE HAVING A SHALLOW RECESSED TRAILING AIR FLOW DAM," filed on Apr. 17, 2007.

FIELD OF THE INVENTION

The present invention relates generally to the field of information storage devices, and more particularly to air bearing sliders used in such devices.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write.

Figure 1:
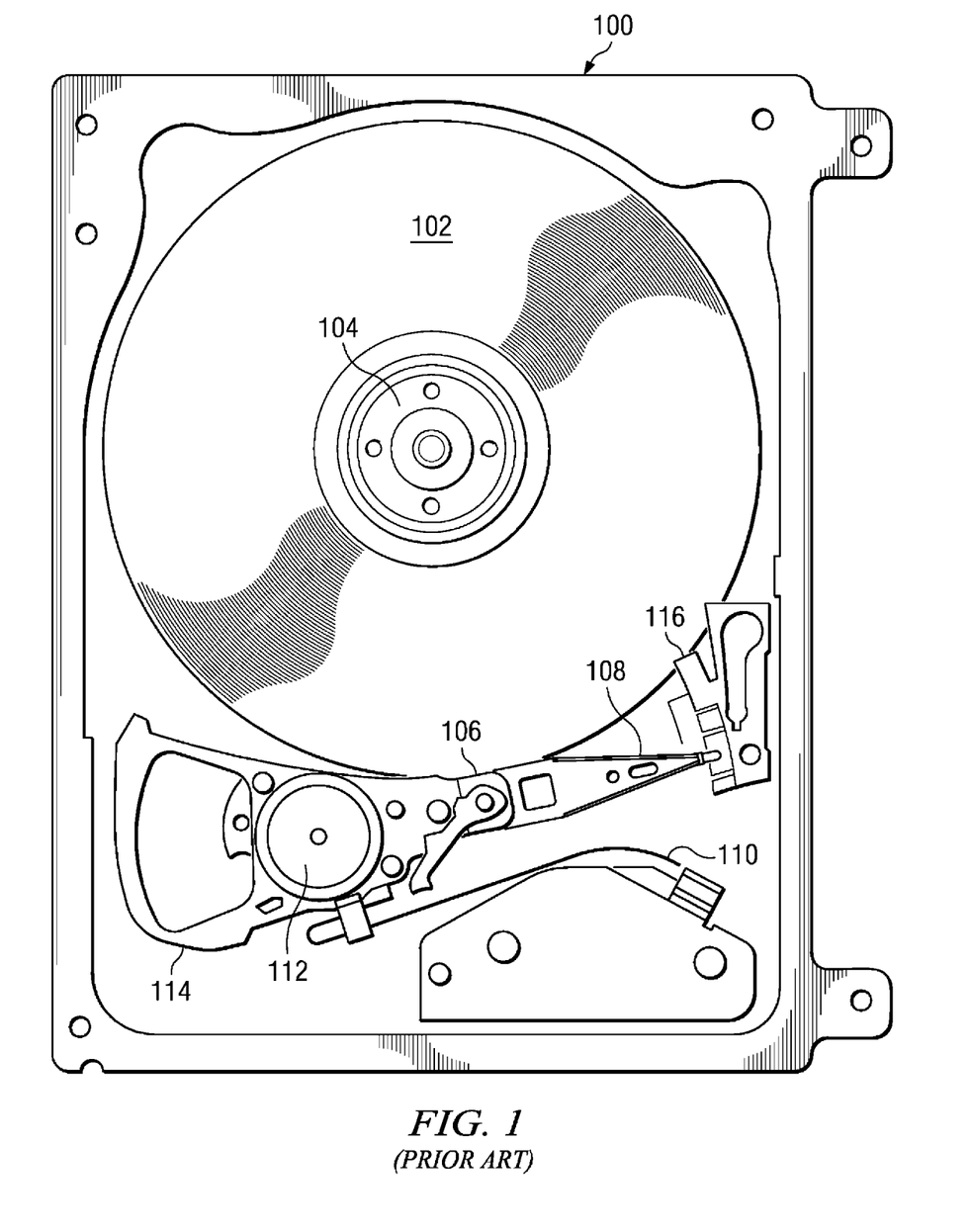
FIG. 1 depicts a contemporary hard disk drive information storage device.

The typical hard disk drive includes a head disk assembly (HDA) and a printed circuit board (PCB) attached to a disk drive base of the HDA. Referring now to FIG. 1, the head disk assembly 100 includes at least one disk 102 (such as a magnetic disk, magneto-optical disk, or optical disk), a spindle motor 104 for rotating the disk, and a head stack assembly (HSA) 106. The spindle motor typically includes a rotating hub on which disks are mounted and clamped, a magnet attached to the hub, and a stator. Various coils of the stator are selectively energized to form an electromagnetic field that pulls/pushes on the magnet, thereby rotating the hub. Rotation of the spindle motor hub results in rotation of the mounted disks. The printed circuit board assembly includes electronics and firmware for controlling the rotation of the spindle motor and for controlling the position of the HSA, and for providing a data transfer channel between the disk drive and its host. The head stack assembly 106 typically includes an actuator, at least one head gimbal assembly (HGA) 108 that includes a head, and a flex cable assembly 110.

During operation of the disk drive, the actuator must rotate to position the heads adjacent desired information tracks on the disk. The actuator includes a pivot bearing cartridge 112 to facilitate such rotational positioning. One or more actuator arms extend from the actuator body. An actuator coil 114 is supported by the actuator body opposite the actuator arms. The actuator coil is configured to interact with one or more fixed magnets in the HDA, typically a pair, to form a voice coil motor. The printed circuit board assembly provides and controls an electrical current that passes through the actuator coil and results in a torque being applied to the actuator. A crash stop is typically provided to limit rotation of the actuator in a given direction, and a latch is typically provided to prevent rotation of the actuator when the disk drive is not in use.

In a magnetic hard disk drive, the head typically comprises a body called a "slider" that carries a magnetic transducer on its trailing end. The magnetic transducer typically comprises a writer and a read element. The magnetic transducer's writer may be of a longitudinal or perpendicular design, and the read element of the magnetic transducer may be inductive or magnetoresistive. In a magnetic hard disk drive, the transducer is typically supported in very close proximity to the magnetic disk by a hydrodynamic air bearing. As the motor rotates the magnetic disk, the hydrodynamic air bearing is formed between an air bearing surface of the slider of the head, and a surface of the magnetic disk. The thickness of the air bearing at the location of the transducer is commonly referred to as "flying height."

Magnetic hard disk drives are not the only type of information storage devices that have utilized air bearing sliders. For example, air bearing sliders have also been used in optical information storage devices to position a mirror and an objective lens for focusing laser light on the surface of disk media that is not necessarily magnetic.

The flying height is a key parameter that affects the performance of an information storage device. Accordingly, the nominal flying height is typically chosen as a careful compromise between each extreme in a classic engineering "trade-off." If the flying height is too high, the ability of the transducer to write and/or read information to/from the disk surface is degraded. Therefore, reductions in flying height can facilitate desirable increases in the areal density of data stored on a disk surface. However, the air bearing between the slider and the disk surface can not be eliminated entirely because the air bearing serves to reduce friction and wear (between the slider and the disk surface) to an acceptable level. Excessive reduction in the nominal flying height degrades the tribological performance of the disk drive to the point where the disk drive's lifetime and reliability become unacceptable.

Another factor that can adversely affect the tribological performance of the head, and therefore also adversely affect the disk drive's lifetime and reliability, is the extent to which lubricant and other debris are picked up or accumulated on the air bearing surface during operation. Excessive accumulation of lubricant or other debris on the air bearing surface can undesirably change the flying characteristics of the slider, potentially leading to immediate reading or writing errors, head crash, or future tribological failure, and/or redeposit on the disk surface at a location or in a quantity that leads to similar problems. To reduce accumulation of lubricant on the air bearing surface disk drive tribologists have been constrained in their choice of lubricants, for example having to opt for a lubricant with less mobile component than would otherwise be desirable. Accordingly, what is needed in the art is an air bearing design that discourages excessive accumulation of lubricant or other debris on the air bearing surface.

SUMMARY

A novel head is disclosed and claimed. The head includes a transducer and a slider having a leading face, a trailing face, and an air bearing surface. The slider has an overcoat layer that includes the trailing face and that overcoats the transducer. The air bearing surface defines an upstream direction pointing from the trailing face to the leading face. The air bearing surface includes a trailing pad having a major surface adjacent the transducer, with the major surface lying in a primary plane. The air bearing surface also includes a subambient pressure cavity disposed upstream of the overcoat layer and being recessed from the primary plane by a cavity depth in the range 0.8 to 2 microns. The overcoat layer includes a trailing air flow dam being recessed from the primary plane by a step depth in the range 0.05 to 0.5 microns.

The overcoat layer also includes a corner region recessed from the primary plane by at least the cavity depth.

DETAILED DESCRIPTION OF EXEMPLARY EMBODIMENTS

Figure 2:
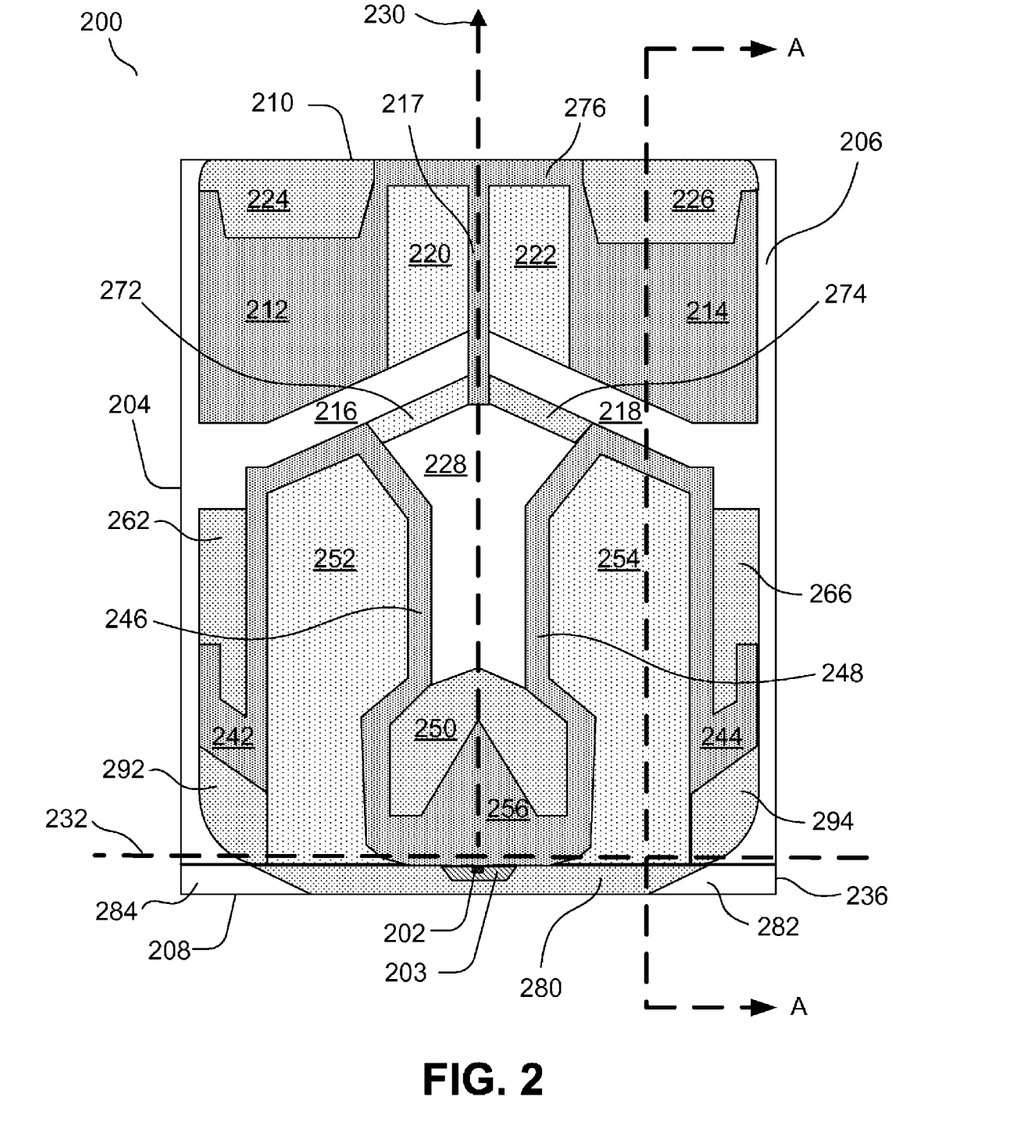
FIG. 2 is an air bearing surface view of a head according to an exemplary embodiment of the present invention (not necessarily to scale).

Now referring to FIG. 2, head 200 comprises a transducer 202 for at least reading information from the disk. In certain embodiments, the transducer 202 is a merged thin film magnetic transducer comprising an inductive writer and magneto resistive read element. In such embodiments, the magneto resistive element may be a giant magneto resistive element (GMR) or tunneling magneto resistive element (TMR). In such embodiments, the writer may be a perpendicular magnetic recording (PMR) writer.

Head 200 also comprises a slider 204, which is typically fabricated from a ceramic material such as alumina titanium carbide. Slider 204 includes an air bearing surface 206, which may be formed on the surface of slider 204 by etching or ion milling and has a geometry that may be defined by use of a mask. The slider 204 has an overcoat layer 236 that includes a trailing face 208 and includes a transducer region 203 that overcoats the transducer 202. The slider 204 also includes a leading face 210.

Figure 3:
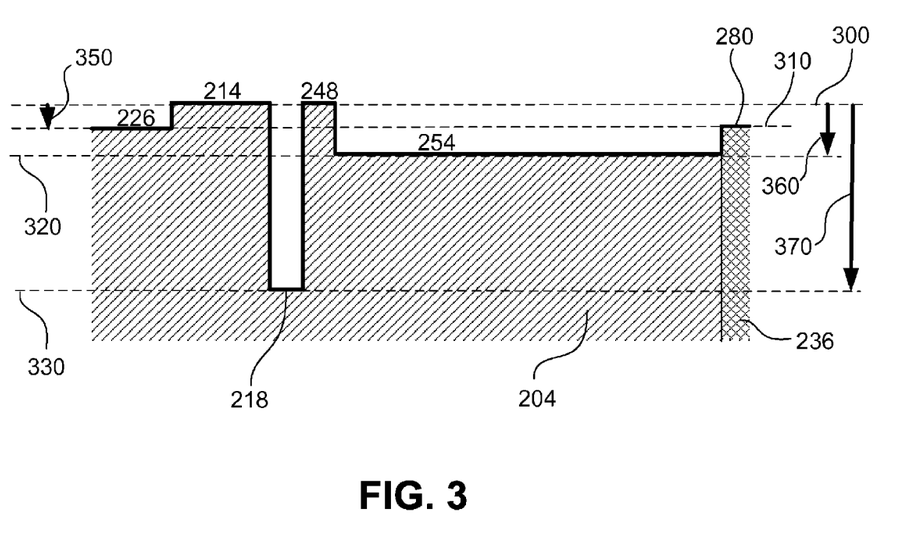
FIG. 3 is cross-sectional view of the head shown in FIG. 2, taken along the plane of cross-section designated as A-A in FIG. 2. For clarity, only the region of the cross-section near the air bearing surface is shown in FIG. 3 and the step heights are not to scale but rather are exaggerated so as to be easily discernible.

In the exemplary embodiment shown in FIG. 2 and FIG. 3, the air bearing surface 206 includes deep cavities 216 and 218, and shallow cavities 220 and 222. During operation, the shallow cavities 220 and 222 can develop a sub-ambient pressure region between the air bearing surface 206 and the surface of an adjacent disk. The sub-ambient pressure may serve to reduce flying height sensitivities to changes in altitude and air bearing geometries.

In the exemplary embodiment shown in FIG. 2 and FIG. 3, the air bearing surface 206 also includes two leading pads 212 and 214 that are adjacent to and upstream of the deep cavities 216 and 218, respectively. The term "upstream" is used herein only to define a directional convention to facilitate description of relative positions on the air bearing surface 206, and does not require the presence or existence of any stream. For example, "upstream" can be understood to refer to a range of directions across the air bearing surface 206 that generally point away from the trailing face 208 and towards the leading face 210. As such, in disk drive applications, upstream directions would ultimately be generally opposite the motion of an adjacent rotating disk surface. An upstream direction would be a direction within the aforementioned range. The term "downstream" is used herein as an antonym of "upstream."

For each upstream direction, the air bearing surface 206 defines a lateral axis that is perpendicular to that upstream direction. For example, for a zero-skew upstream direction 230 that is parallel to the air bearing surface 206 and parallel to the plane of cross-section AA depicted in FIG. 2, the air bearing surface defines a corresponding lateral axis 232 that is parallel to the leading face 210 or the trailing face 208 (i.e. orthogonal to that upstream direction). The slider width can be measured along lateral axis 232. Of course, non-zero skew upstream directions are also contemplated herein.

The two leading pads 212, 214 may be separated by shallow cavities 220 and 222, respectively, and shallow cavities 220 and 222 may themselves be separated by a longitudinal divider 217.

Now referring additionally to FIG. 3, the leading pads 212 and 214 each include a major surface that is not recessed and instead establishes an air bearing surface datum plane (hereinafter referred to as the primary plane) 300, from which the recession of other surfaces that are approximately parallel to the primary plane 300 may be measured. During operation, the leading pads 212 and 214 can develop a super-ambient pressure region between the air bearing surface 206 and the surface of an adjacent disk, causing the slider to assume a positive pitch attitude. Deep cavities 216 and 218 each include a surface in a plane 330 that is recessed from the primary plane 300 by a deep cavity recession depth 370. The deep cavity recession depth is preferably but not necessarily in the range 3 microns to 4 microns. Shallow cavities 220 and 222 each include a surface in an intermediate plane 320 that lies between the primary plane 300 and the deep cavity plane 330, and that is recessed from the primary plane 300 by a shallow cavity recession depth 360. For example, the shallow cavity recession depth 360 is preferably in the range 0.8 microns to 2 microns.

In the exemplary embodiment shown in FIG. 2 and FIG. 3, the leading pads 212 and 214 are connected by a leading dam 276 that helps prevent particulate contamination from entering the air bearing, and that assists in creating sub-ambient pressure in shallow cavities 220 and 222. The leading pads 212 and 214 also include leading pressurizing steps 224 and 226, respectively. The leading pressurizing steps 224 and 226 each include a surface in a plane 310 that lies between the primary plane 300 and the intermediate plane 320. The plane 310 is recessed from the primary plane 300 by a pressurizing step recession depth 350. During operation, the leading pressurizing steps 224 and 226 can help develop super-ambient pressure between the leading pads 212 and 214, respectively and the surface of an adjacent disk. The pressurizing step recession depth 350 is preferably in the range 0.05 microns to 0.5 microns. In certain embodiments, fabrication of the air bearing surface can be simplified if the deep cavity recession depth 370 is equal to the sum of the shallow cavity recession depth 360 and the pressurizing step recession depth 350.

Also in the exemplary embodiment of FIG. 2 and FIG. 3, the air bearing surface 206 includes mid-cavity dams 272 and 274 that are disposed upstream of a central cavity 228. Mid-cavity dam 272 includes a surface in the plane 320, while mid-cavity dam 274 includes a surface in the plane 310. Moreover, mid-cavity dam 272 is oriented to confront the skewed incoming air flow when the head is near the inner diameter of the disk, while mid-cavity dam 274 is oriented to confront the differently-skewed incoming air flow when the head is near the outer diameter of the disk. Because mid-cavity dam 272 is recessed from the primary plane 300 more than mid-cavity dam 274 is, mid-cavity dam 272 tends to allow airflow into central cavity 228 more easily than mid-cavity dam 274 does. This difference in recession can be used by the air bearing designer to desensitize the flying height to changes in the radial position of the head relative to the spinning underlying disk, given that the incoming air flow has a higher velocity near the outer diameter of the disk and a lower velocity near the inner diameter of the disk. If the air bearing designer advantageously opts to use the mid-cavity dams 272 and 274 to desensitize the flying height to changes in the radial position of the head relative to the spinning underlying disk, then the air bearing designer will have more freedom to design downstream features of the air bearing 206, for example to include contamination-reducing features, and/or to reduce air bearing sensitivity to changes in operating altitude, applied bias forces and torques, etc.

In the exemplary embodiment of FIG. 2, the air bearing surface 206 also includes a trailing pad 256 having a major surface adjacent the transducer 202, the major surface lying in the primary plane 300. During operation, the trailing pad 256 can develop a super-ambient pressure region between the air bearing surface 206 and the surface of an adjacent disk that can help maintain a desired flying height at the location of transducer 202. For example, in the embodiment of FIG. 2, the trailing pad 256 creates a region of high pressure, including the highest pressure generated by the air bearing surface during normal operation of the head.

In the embodiment of FIG. 2, a pressurizing step surface 250 is disposed upstream of the trailing pad 256. The pressurizing step surface 250 includes a surface that lies in the plane 310. For example, the step surface may be recessed from the first surface 300 by the pressurizing step recession depth 350. During operation, the pressurizing step surface 250 can enhance the super-ambient pressure between the trailing pad 256 and the surface of an adjacent disk. Such enhanced pressurization may increase air bearing stiffness and/or may reduce the surface area required for the trailing pad 256.

Trailing pad side portions 246 and 248 can enhance the performance of the pressurizing step surface 250 by partially confining the airflow to pressurize the trailing pad 256. In the embodiment of FIG. 2, the trailing pad 256, and the trailing pad side portions 246 and 248, together form a trailing center pressurizing structure that has the general shape of the letter "W." For example, the trailing pad 256 includes the center peak of the letter "W," and the trailing pad side portions 246 and 248 could be considered to be the outer sides of the letter "W." In the embodiment of FIG. 2, the W that is oriented so that the center peak of the W points in the upstream direction 230.

In the embodiment of FIGS. 2 & 3, the overcoat layer 236 includes a trailing air flow dam 280 being recessed from the primary plane 300 by a step depth in the range 0.05 to 0.5 microns. The breadth of the trailing air flow dam 280, measured parallel to the upstream direction 230, is determined by masking during fabrication and so is not necessarily (though preferably) equal to the thickness of the overcoat layer 236 (e.g. 20 to 50 microns). Preferably the trailing air flow dam 280 is recessed from the primary plane 300 by an amount approximately equal to the pressurizing step recession depth 350, as shown in FIG. 3. However, in certain embodiments the trailing air flow dam 280 is recessed from the primary plane 300 by an amount that is approximately equal to but marginally more than the pressurizing step recession depth 350, because of a difference in material etch rates. Specifically, the leading pressurizing steps 224 and 226 are disposed over the main body of the slider 204, which typically comprises a ceramic wafer substrate material such as alumina titanium carbide, while the trailing air flow dam 280 comprises an overcoat material such as alumina. Alumina typically etches away more rapidly than does alumina titanium carbide during fabrication of the leading pressurizing steps 224 and 226 and the trailing air flow dam 280. For example, because of the difference in etching rates, the trailing air flow dam 280 may be recessed up to 30% more than the pressurizing step recession depth 350.

In the embodiment of FIG. 2, the transducer region 203 is not etched; rather its surface lies close to the primary plane 300. In certain embodiments, the transducer region 203 is marginally recessed from the primary plane 300 due to lapping. For example, the transducer region 203 may be recessed from the primary plane 300 approximately 2.5 nanometers due to lapping. The transducer region 203 may also slightly protrude beyond the primary plane 300 due to thermal expansion (e.g. thermal pole tip protrusion and/or thermal dynamic transducer actuation).

In the embodiment of FIG. 2, the overcoat layer 236 also includes corner regions 282 and 284 recessed from the primary plane by at least the deep cavity recession depth 370. The corner regions 282 and 284 can be a desirable feature for avoiding rear corner contacts should the slider excessively roll relative to the disk surface during operation of the head and/or during a mechanical shock event.

In the embodiment of FIG. 2, the air bearing surface 206 defines a lateral axis 232 that is orthogonal to the upstream direction 230, and the slider 204 has a width measured along the lateral axis 232. In the embodiment of FIG. 2, the trailing air flow dam 280 laterally spans at least 75% of the width of the slider 204, with the corner regions 282 and 284 spanning the remainder of the width of the slider 204. The trailing air flow dam 280 itself can be considered to comprise a left portion (the portion extending from the transducer 202 along the lateral axis 232 to the left in FIG. 2), and a right portion (the portion extending from the transducer 202 along the lateral axis 232 to the right in FIG. 2). Preferably, the left and right portions together laterally span at least 75% of the width of the slider 204. However, in certain embodiments, the left and right portions extend to the left and right, respectively, not from the transducer 202, but rather from the relatively wider trailing pad 256. In such embodiments, the left and right portions of the trailing air flow dam 280 may not together laterally span at least 75% of the width of the slider 204; rather, in such embodiments the left and right portions of the trailing air flow dam 280, together with the trailing pad 256 preferably cumulatively laterally span at least 75% of the width of the slider 204.

In the embodiment of FIGS. 2 & 3, the air bearing surface 206 also includes two sub-ambient pressure cavities 252, 254 disposed adjacent to and upstream of the trailing air flow dam 280. The sub-ambient pressure cavities 252, 254 each include a surface in the plane 320 that is recessed from the primary plane 300 by the shallow cavity recession depth 360. Trailing pad side portions 246 and 248 may also extend around sub-ambient pressure cavities 252 and 254, to assist in the development of sub-ambient pressure within sub-ambient pressure cavities 252 and 254. During operation, the sub-ambient pressure cavities 252 and 254 may develop sub-ambient pressure in much the same way that shallow cavities 220 and 222 do, and thereby shift an effective center of net sub-ambient pressure rearward (towards the trailing face of the slider). Such a shift can facilitate separating the slider from the disk surface dynamically, during operation.

In the embodiment of FIGS. 2 & 3, the trailing air flow dam 280 may serve to reduce back flow from adjacent the trailing face 208 in the upstream direction 230 into the sub-ambient pressure cavities 252, 254, which, in turn, may serve to reduce the accumulation of lubricant and/or other debris in the sub-ambient pressure cavities 252, 254. The trailing air flow dam 280 is recessed from the primary plane 300 because, if it were not recessed, the air bearing designer could not allow the trailing air flow dam 280 to extend laterally sufficiently to adequately reduce back flow without potentially interfering with the disk surface given a non-zero roll angle. Specifically, during operation the air bearing 206 typically makes a non-zero roll angle with respect to the disk surface while it is desired that the location of minimum thickness of the air bearing be at or near the location of the transducer 202 (rather than on the trailing air flow dam 280).

In the embodiment of FIG. 2, the air bearing surface 206 also includes side pads 242 and 244. The side pads 242 and 244 each include a major surface that lies in the primary plane 300. Accordingly, the side pads 242 and 244 are located further upstream than the aft-most extent of the trailing pad 256. The side pad 242 includes side pressurizing step 262 and a side trailing step 292, each of which includes a surface in plane 310. The side pad 244 includes side pressurizing step 266 and a side trailing step 294, each of which includes a surface in plane 310.

Figure 4:
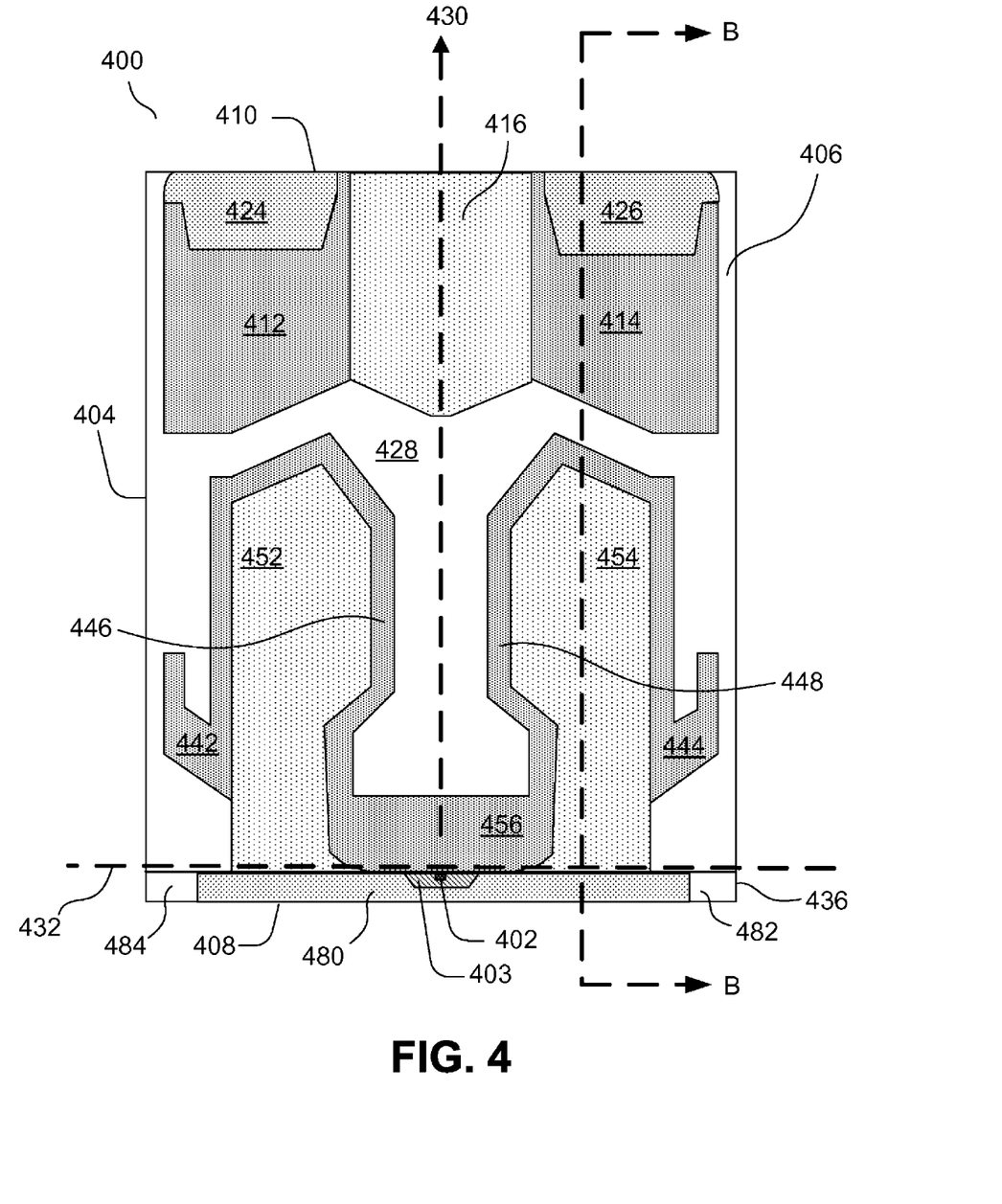
FIG. 4 is an air bearing surface view of a head according to another exemplary embodiment of the present invention (not necessarily to scale).

Now referring to FIG. 4, head 400 comprises a transducer 402 for at least reading information from the disk. In certain embodiments, the transducer 402 is a merged transducer comprising both a writer and a read element. Head 400 also comprises a slider 404 that includes an air bearing surface 406. The slider 404 has an overcoat layer 436 that includes a trailing face 408 and includes a transducer region 403 that overcoats the transducer 402. The slider 404 also includes a leading face 410.

Figure 5:
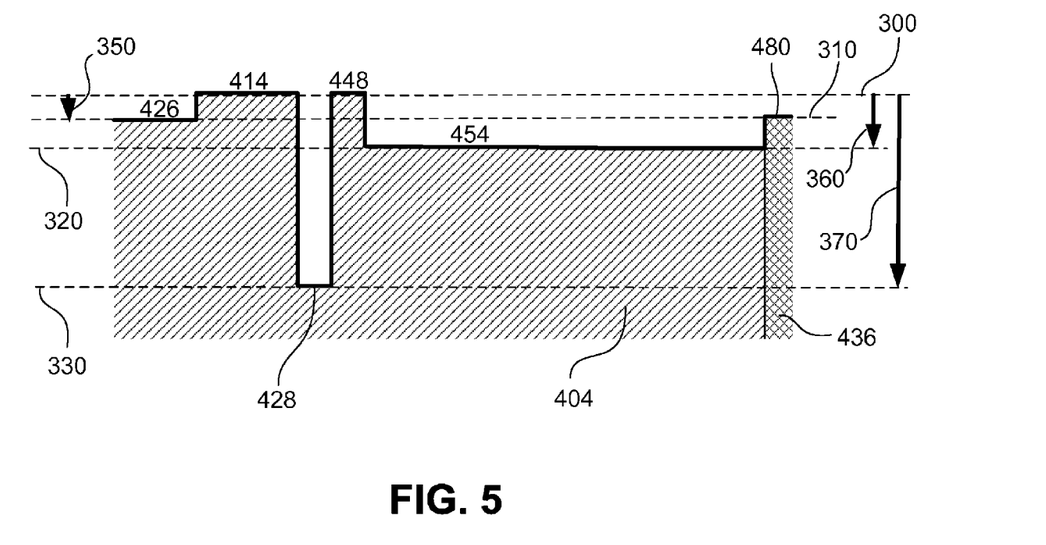
FIG. 5 is cross-sectional view of the head shown in FIG. 4, taken along the plane of cross-section designated as B-B in FIG. 4. For clarity, only the region of the cross-section near the air bearing surface is shown in FIG. 5 and the step heights are not to scale but rather are exaggerated so as to be easily discernible.

In the exemplary embodiment shown in FIG. 4 and FIG. 5, the air bearing surface 406 includes deep cavity 428. In the exemplary embodiment shown in FIG. 4 and FIG. 5, the air bearing surface 406 also includes shallow cavity 416. During operation, the shallow cavity 416 can develop a sub-ambient pressure region between the air bearing surface 406 and the surface of an adjacent disk. The sub-ambient pressure may serve to reduce flying height sensitivity to changes in altitude.

In the exemplary embodiment shown in FIG. 4, the air bearing surface 406 also includes two leading pads 412 and 414 that are separated by the shallow cavity 416. Now referring additionally to FIG. 5, the leading pads 412 and 414 each include a major surface that is not recessed and instead lies in the primary plane 300. During operation, the leading pads 412 and 414 can develop a super-ambient pressure region between the air bearing surface 406 and the surface of an adjacent disk, causing the slider to assume a positive pitch attitude. Deep cavity 428 includes a surface in the plane 330 that is recessed from the primary plane 300 by the deep cavity recession depth 370. Shallow cavity 416 includes a surface in the intermediate plane 320 that lies between the primary plane 300 and the deep cavity plane 330, and that is recessed from the primary plane 300 by the shallow cavity recession depth 360.

In the exemplary embodiment shown in FIG. 4 and FIG. 5, the leading pads 412 and 414 also include leading pressurizing steps 424 and 426, respectively. The leading pressurizing steps 424 and 426 each include a surface in the plane 310 that lies between the primary plane 300 and the intermediate plane 320, and that is recessed from the primary plane 300 by the pressurizing step recession depth 350. During operation, the leading pressurizing steps 424 and 426 can help develop super-ambient pressure between the leading pads 412 and 414, respectively and the surface of an adjacent disk.

In the exemplary embodiment of FIG. 4, the air bearing surface 406 also includes a trailing pad 456 having a major surface adjacent the transducer 402, the major surface lying in the primary plane 300. During operation, the trailing pad 456 can develop a super-ambient pressure region between the air bearing surface 406 and the surface of an adjacent disk that can help maintain a desired flying height at the location of transducer 402. For example, in the embodiment of FIG. 4, the trailing pad 456 creates a region of high pressure, including the highest pressure generated by the air bearing surface during normal operation of the head. In the exemplary embodiment of FIG. 4, the air bearing surface 406 also includes trailing pad side portions 446 and 448, which may serve to enhance the pressurization of trailing pad 456.

In the embodiment of FIGS. 4 & 5, the overcoat layer 436 includes a trailing air flow dam 480 being recessed from the primary plane 300 by a step depth in the range 0.05 to 0.5 microns. The breadth of the trailing air flow dam 480, measured parallel to the upstream direction 430, is determined by masking during fabrication and so is not necessarily (though preferably) equal to the thickness of the overcoat layer 436 (e.g. 20 to 50 microns). Preferably the trailing air flow dam 480 is recessed from the primary plane 300 by an amount approximately equal to the pressurizing step recession depth 350, as shown in FIG. 5. However, in certain embodiments the trailing air flow dam 480 is recessed from the primary plane 300 by an amount approximately equal to but marginally more than the pressurizing step recession depth 350, because of the aforementioned difference in material etch rates. For example, because of the difference in etching rates, the trailing air flow dam 480 may be recessed up to 30% more than the pressurizing step recession depth 350.

In the embodiment of FIG. 4, the transducer region 403 is not etched; rather its surface lies close to the primary plane 300. In certain embodiments, the transducer region 403 is marginally recessed from the primary plane 300 due to lapping. For example, the transducer region 403 may be recessed from the primary plane 300 approximately 2.5 nanometers due to lapping. The transducer region 403 may also slightly protrude beyond the primary plane 300 due to thermal expansion (e.g. thermal pole tip protrusion and/or thermal dynamic transducer actuation).

In the embodiment of FIG. 4, the overcoat layer 436 also includes corner regions 482 and 484 recessed from the primary plane by at least the deep cavity recession depth 370.

In the embodiment of FIG. 4, the air bearing surface 406 defines a lateral axis 432 that is orthogonal to the upstream direction 430, and the slider 404 has a width measured along the lateral axis 432. In the embodiment of FIG. 4, the trailing air flow dam 480 laterally spans at least 75% of the width of the slider 404, with the corner regions 482 and 484 spanning the remainder of the width of the slider 404. The trailing air flow dam 480 itself can be considered to comprise a left portion (the portion extending from the transducer 402 along the lateral axis 432 to the left in FIG. 4), and a right portion (the portion extending from the transducer 402 along the lateral axis 432 to the right in FIG. 4). Preferably, the left and right portions together laterally span at least 75% of the width of the slider 404. However, in certain embodiments, the left and right portions extend to the left and right, respectively, not from the transducer 402, but rather from the relatively wider trailing pad 456. In such embodiments, the left and right portions of the trailing air flow dam 480 may not together laterally span at least 75% of the width of the slider 404; rather, in such embodiments the left and right portions of the trailing air flow dam 480, together with the trailing pad 456 preferably cumulatively laterally span at least 75% of the width of the slider 404.

In the embodiment of FIGS. 4 & 5, the air bearing surface 406 also includes two sub-ambient pressure cavities 452, 454 disposed adjacent to and upstream of the trailing air flow dam 480. The sub-ambient pressure cavities 452, 454 each include a surface in the plane 320 that is recessed from the primary plane 300 by the shallow cavity recession depth 360. Trailing pad side portions 446 and 448 may also extend around sub-ambient pressure cavities 452 and 454, to assist in the development of sub-ambient pressure within sub-ambient pressure cavities 452 and 454. During operation, the sub-ambient pressure cavities 452 and 454 may develop sub-ambient pressure in much the same way that shallow cavity 416 does, and thereby shift an effective center of net sub-ambient pressure rearward (towards the trailing face of the slider). Such a shift can facilitate separating the slider from the disk surface dynamically, during operation.

In the embodiment of FIGS. 4 & 5, the trailing air flow dam 480 may serve to reduce back flow from adjacent the trailing face 408 in the upstream direction 430 into the sub-ambient pressure cavities 452, 454, which, in turn, may serve to reduce the accumulation of lubricant and/or other debris in the sub-ambient pressure cavities 452, 454.

In the embodiment of FIG. 4, the air bearing surface 406 also includes side pads 442 and 444. The side pads 442 and 444 each include a major surface that lies in the primary plane 300. Accordingly, the side pads 442 and 444 are located further upstream than the aft-most extent of the trailing pad 456.

Figure 6:
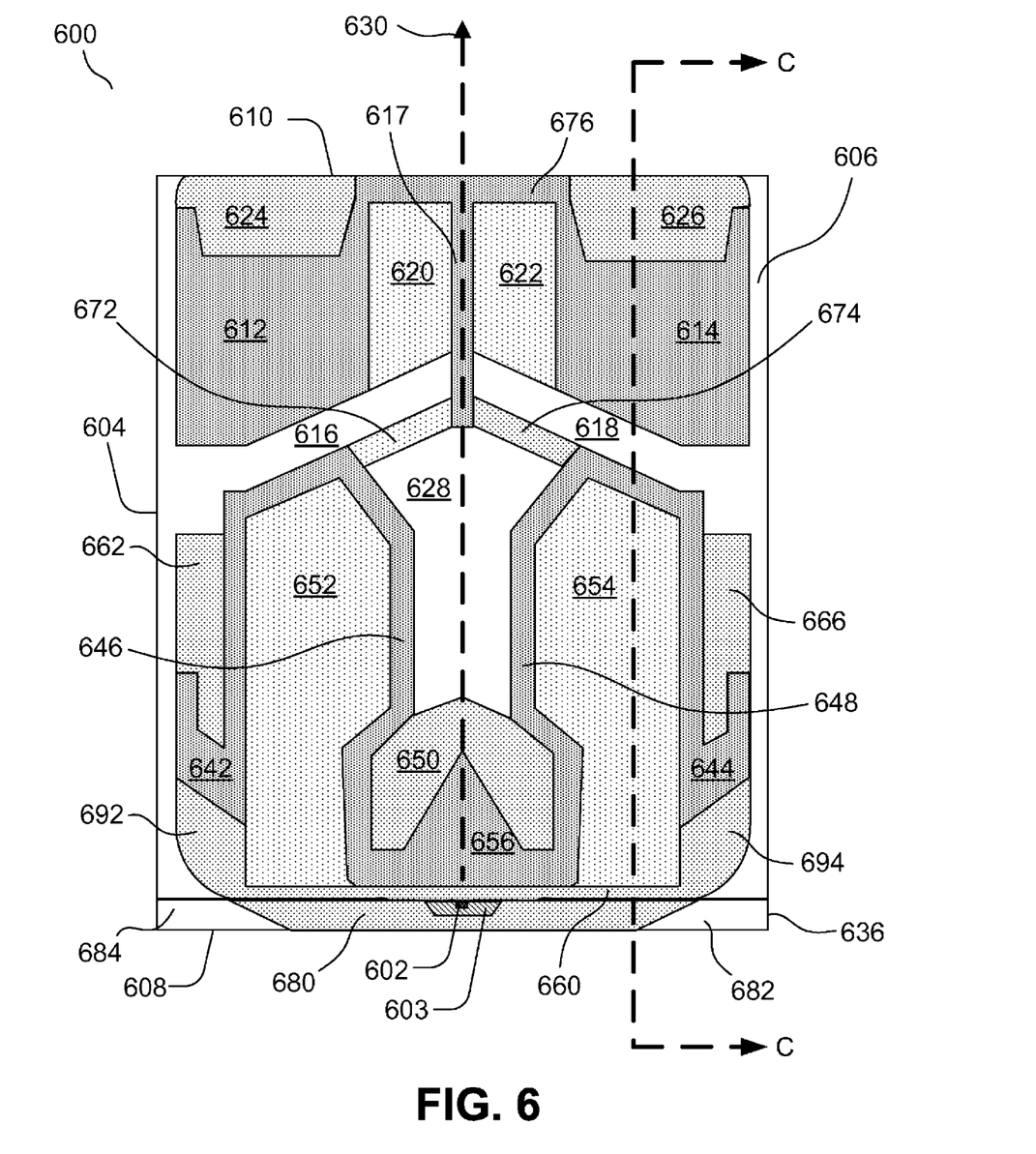
FIG. 6 is an air bearing surface view of a head according to another exemplary embodiment of the present invention (not necessarily to scale).

Now referring to FIG. 6, head 600 comprises a transducer 602 for at least reading information from the disk. Head 600 also comprises a slider 604, which may be fabricated from a wafer substrate material such as alumina titanium carbide or silicon. Slider 604 includes an air bearing surface 606, which may be formed on the surface of slider 604 by etching or ion milling and has a geometry that may be defined by use of a mask. The slider 604 has an overcoat layer 636 that includes a trailing face 608 and includes a transducer region 603 that overcoats the transducer 602. The slider 604 also includes a leading face 610. A zero-skew upstream direction 630 points from the trailing face 608 towards the leading face 610.

Figure 7:
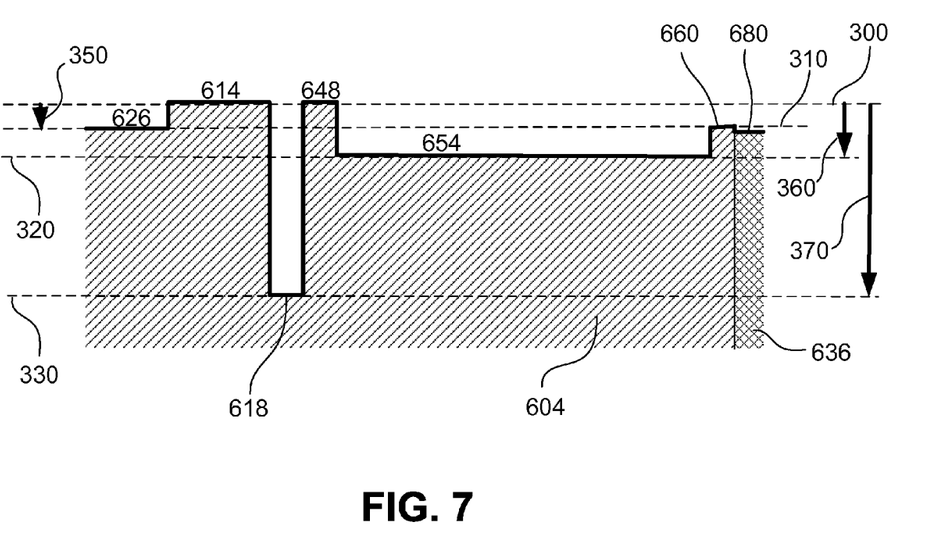
FIG. 7 is cross-sectional view of the head shown in FIG. 6, taken along the plane of cross-section designated as C-C in FIG. 6. For clarity, only the region of the cross-section near the air bearing surface is shown in FIG. 7 and the step heights are not to scale but rather are exaggerated so as to be easily discernible.

In the exemplary embodiment shown in FIG. 6 and FIG. 7, the air bearing surface 606 includes deep cavities 616 and 618, and shallow cavities 620 and 622. During operation, the shallow cavities 620 and 622 can develop a sub-ambient pressure region between the air bearing surface 606 and the surface of an adjacent disk. The sub-ambient pressure may serve to reduce flying height sensitivities to changes in altitude and air bearing geometries.

In the exemplary embodiment shown in FIG. 6 and FIG. 7, the air bearing surface 606 also includes two leading pads 612 and 614 that are adjacent to and upstream of the deep cavities 616 and 618, respectively. The two leading pads 612, 614 may be separated by shallow cavities 620 and 622, respectively, and shallow cavities 620 and 622 may themselves be separated by a longitudinal divider 617.

Now referring additionally to FIG. 7, the leading pads 612 and 614 each include a major surface that is not recessed and instead establishes the primary plane 300, from which the recession of other surfaces that are approximately parallel to the primary plane 300 may be measured. During operation, the leading pads 612 and 614 can develop a super-ambient pressure region between the air bearing surface 606 and the surface of an adjacent disk, causing the slider to assume a positive pitch attitude. Deep cavities 616 and 618 each include a surface in the plane 330 that is recessed from the primary plane 300 by the deep cavity recession depth 370. Shallow cavities 620 and 622 each include a surface in the intermediate plane 320 that lies between the primary plane 300 and the deep cavity plane 330, and that is recessed from the primary plane 300 by a shallow cavity recession depth 360.

In the exemplary embodiment shown in FIG. 6 and FIG. 7, the leading pads 612 and 614 are connected by a leading dam 676 that helps prevent particulate contamination from entering the air bearing, and that assists in creating sub-ambient pressure in shallow cavities 620 and 622. The leading pads 612 and 614 also include leading pressurizing steps 624 and 626, respectively. The leading pressurizing steps 624 and 626 each include a surface in a plane 310 that lies between the primary plane 300 and the intermediate plane 320. The plane 310 is recessed from the primary plane 300 by a pressurizing step recession depth 350. During operation, the leading pressurizing steps 624 and 626 can help develop super-ambient pressure between the leading pads 612 and 614, respectively, and the surface of an adjacent disk.

Also in the exemplary embodiment of FIG. 6 and FIG. 7, the air bearing surface 606 includes mid-cavity dams 672 and 674 that are disposed upstream of a central cavity 628, and are structured and function in a similar manner as in the embodiment of FIGS. 2 and 3. In the exemplary embodiment of FIG. 6, the air bearing surface 606 also includes a trailing pad 656 having a major surface adjacent the transducer 602, the major surface lying in the primary plane 300. In the embodiment of FIG. 6, a pressurizing step surface 650 is disposed upstream of the trailing pad 656. The pressurizing step surface 650 includes a surface that lies in the plane 310. Trailing pad side portions 646 and 648 can enhance the performance of the pressurizing step surface 650 by partially confining the airflow to pressurize the trailing pad 656.

In the embodiment of FIGS. 6 & 7, the air bearing surface 606 includes a trailing air flow dam 660 that includes a major surface in the plane 310. In the embodiment of FIGS. 6 & 7, the overcoat layer 636 also includes a trailing air flow dam 680 being recessed from the primary plane 300 by a step depth in the range 0.05 to 0.5 microns. Preferably the trailing air flow dam 680 is recessed from the primary plane 300 by an amount approximately equal to the pressurizing step recession depth 350, as shown in FIG. 7. However, in certain embodiments the trailing air flow dam 680 is recessed from the primary plane 300 by an amount approximately equal to but marginally more than the pressurizing step recession depth 350, because of a difference in material etch rates. Specifically, the trailing air flow dam 660 is disposed over the main body of the slider 604, which typically comprises a ceramic wafer substrate material such as alumina titanium carbide, while the trailing air flow dam 680 is disposed in the overcoat material (e.g. $Al_2O_3$, $SiO_2$). Alumina typically etches away more rapidly than does alumina titanium carbide during fabrication of the trailing air flow dams 660 and 680. For example, because of the difference in etching rates, the trailing air flow dam 680 may be recessed up to 30% more than the trailing air flow dam 660. The combined breadth of the trailing air flow dams 660 and 680, measured parallel to the upstream direction 630, is determined by masking during fabrication and may exceed the thickness of the overcoat layer 636 (e.g. 20 to 50 microns).

In the embodiment of FIG. 6, the transducer region 603 is not etched; rather its surface lies close to the primary plane 300. In certain embodiments, the transducer region 603 is marginally recessed from the primary plane 300 due to lapping. For example, the transducer region 603 may be recessed from the primary plane 300 approximately 2.5 nanometers due to lapping. The transducer region 603 may also slightly protrude beyond the primary plane 300 due to thermal expansion (e.g. thermal pole tip protrusion and/or thermal dynamic transducer actuation). In the embodiment of FIG. 6, the overcoat layer 636 also includes corner regions 682 and 684 recessed from the primary plane by at least the deep cavity recession depth 370.

In the embodiment of FIG. 6, the trailing air flow dam 680 laterally spans at least 75% of the width of the slider 604, with the corner regions 682 and 684 spanning the remainder of the width of the slider 604.

In the embodiment of FIGS. 6 & 7, the air bearing surface 606 also includes two sub-ambient pressure cavities 652, 654 disposed just upstream of the trailing air flow dams 660 and 680. The sub-ambient pressure cavities 652, 654 each include a surface in the plane 320 that is recessed from the primary plane 300 by the shallow cavity recession depth 360. Trailing pad side portions 646 and 648 may also extend around sub-ambient pressure cavities 652 and 654, to assist in the development of sub-ambient pressure within sub-ambient pressure cavities 652 and 654.

In the embodiment of FIGS. 6 & 7, the trailing air flow dams 660 and 680 may serve to reduce back flow from adjacent the trailing face 608 in the upstream direction 630 into the sub-ambient pressure cavities 652, 654, which, in turn, may serve to reduce the accumulation of lubricant and/or other debris in the sub-ambient pressure cavities 652, 654.

In the embodiment of FIG. 6, the air bearing surface 606 also includes side pads 642 and 644. The side pads 642 and 644 each include a major surface that lies in the primary plane 300. Accordingly, the side pads 642 and 644 are located further upstream than the aft-most extent of the trailing pad 656. The side pad 642 includes side pressurizing step 662 and a side trailing step 692, each of which includes a surface in plane 310. The side pad 644 includes side pressurizing step 666 and a side trailing step 694, each of which includes a surface in plane 310.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

What is claimed is:

1. A head comprising:
   a slider having a leading face and a trailing face and an air bearing surface, the air bearing surface defining an upstream direction pointing from the trailing face to the leading face; and
   a transducer;
   the slider also having an overcoat layer, the overcoat layer including the trailing face and overcoating the transducer;
   wherein the air bearing surface includes:
      a trailing pad including a major surface adjacent the transducer, the major surface lying in a primary plane;
      a sub-ambient pressure cavity disposed upstream of the overcoat layer and being recessed from the primary plane by a cavity depth in the range 0.8 to 2 microns; and
   wherein the overcoat layer includes:
      a trailing air flow dam being recessed from the primary plane by a step depth in the range 0.05 to 0.5 microns, and
      a corner region recessed from the primary plane by at least the cavity depth.

2. The head of claim 1 wherein the slider comprises a wafer substrate material.

3. The head of claim 2 wherein the wafer substrate material is selected from the group consisting of AlTiC and Si.

4. The head of claim 1 wherein the overcoat layer comprises a deposited insulative material.

5. The head of claim 4 wherein the deposited insulative material is selected from the group consisting of $Al_2O_3$ and $SiO_2$.

6. The head of claim 1 wherein the trailing pad is shaped like a letter W that is oriented so that the center peak of the W points in the upstream direction.

7. The head of claim 1 further including a step surface immediately upstream of the trailing pad, the step surface being recessed from the primary plane by no more than the step depth.

8. The head of claim 1 wherein the air bearing surface further defines a lateral axis that is orthogonal to the upstream direction, the slider having a width measured along the lateral axis, and wherein the trailing air flow dam laterally spans at least 75% of the width of the slider.

9. The head of claim 8 wherein the trailing air flow dam comprises a left portion extending from the transducer along the lateral axis in a first direction, and a right portion extending from the transducer along the lateral axis opposite the first direction, the left and right portions together laterally spanning at least 75% of the width of the slider.

10. The head of claim 1 wherein the air bearing surface further comprises a deep cavity, the deep cavity being recessed from the primary plane by 3 to 4 microns.

11. The head of claim 1 wherein the transducer is a merged magnetic transducer that includes a read element and a writer.

* * * * *